(12) United States Patent
Ji et al.

(10) Patent No.: US 10,141,823 B2
(45) Date of Patent: Nov. 27, 2018

(54) MOTOR, GIMBAL, AND MECHANICAL ARM HAVING THE SAME

(71) Applicant: AUTEL ROBOTICS CO., LTD., Shenzhen, Guangdong (CN)

(72) Inventors: Zhipeng Ji, Guangdong (CN); Zhengli Zhang, Guangdong (CN); Faquan Chen, Guangdong (CN)

(73) Assignee: AUTEL ROBOTICS CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/784,556

(22) Filed: Oct. 16, 2017

(65) Prior Publication Data

US 2018/0248454 A1 Aug. 30, 2018

Related U.S. Application Data

(63) Continuation of application No. PCT/CN2017/080460, filed on Apr. 13, 2017.

(30) Foreign Application Priority Data

Feb. 27, 2017 (CN) .................. 2017 1 01080242

(51) Int. Cl.
*H02K 21/24* (2006.01)
*H02K 3/26* (2006.01)
(Continued)

(52) U.S. Cl.
CPC ............. *H02K 21/24* (2013.01); *H02K 3/26* (2013.01); *H02K 11/215* (2016.01); *H02K 11/33* (2016.01);
(Continued)

(58) Field of Classification Search
CPC .... F16M 11/10; F16M 11/18; F16M 11/2071; G02B 27/646; G02B 27/644;
(Continued)

(56) References Cited

U.S. PATENT DOCUMENTS 4,570,254 A * 2/1986 Agostini ............ G11B 19/2009
720/696
8,283,813 B2 * 10/2012 Gilchrist .................. H02K 7/09
310/114

(Continued)

*Primary Examiner* — Naishadh Desai
(74) *Attorney, Agent, or Firm* — Ladas & Parry LLP

(57) ABSTRACT

The present application relates to the field of motors, and provides a motor, a gimbal and a mechanical are having the same. The motor includes a support, a circuit board installed on the support and including a coil circuit, a rotating shaft, and a permanent magnet. The support is installed on the rotating shaft. The permanent magnet is disposed adjacent to the coil circuit, and there is a gap between the permanent magnet and the coil circuit. The permanent magnet is of an axially magnetized structure. In the present application, the circuit board is adopted as a carrier of the coil circuit to replace an icon core in the traditional technology, thereby eliminating defects such as cogging torque, hysteresis, and eddy-current losses that are generated by an existing motor from the root. More over, the axial size of the motor and the weight and volume of the motor are reduced.

26 Claims, 9 Drawing Sheets

(51) Int. Cl.
*H02K 11/33* (2016.01)
*H04N 5/247* (2006.01)
*H04N 5/225* (2006.01)
*H02K 11/215* (2016.01)

(52) U.S. Cl.
CPC ......... *H04N 5/2252* (2013.01); *H04N 5/2253* (2013.01); *H04N 5/247* (2013.01)

(58) Field of Classification Search
CPC .... B64C 39/024; B64D 47/08; G03B 15/006; H04N 5/23258; H04N 5/2328; H04N 7/183; H04N 5/2252; H04N 22/53; H04N 5/247; H02K 21/24; H02K 11/215; H02K 11/33; H02K 3/26
USPC .................................................. 310/156.01
See application file for complete search history.

(56) References Cited

U.S. PATENT DOCUMENTS

| | | | | |
|---|---|---|---|---|
| 2008/0098832 | A1* | 5/2008 | Abbasi | H02K 15/00 73/865.9 |
| 2008/0277094 | A1* | 11/2008 | Peng | F04D 25/0653 165/80.3 |
| 2012/0212086 | A1* | 8/2012 | Nagayama | H02K 5/15 310/59 |
| 2012/0240710 | A1* | 9/2012 | Yokoyama | B25J 9/1065 74/490.05 |
| 2014/0037278 | A1* | 2/2014 | Wang | F16M 11/10 396/55 |
| 2015/0236570 | A1* | 8/2015 | Hayashi | H02K 11/0073 310/45 |
| 2016/0325761 | A1* | 11/2016 | Pruessmeier | B60L 5/08 |

\* cited by examiner

MOTOR, GIMBAL, AND MECHANICAL ARM HAVING THE SAME

CROSS-REFERENCE

This application is a continuation application of International Application No. PCT/CN2017/080460, filed Apr. 13, 2017, which claims priority of Chinese Patent Application No. 201710108024.2, filed on Feb. 27, 2017, which is incorporated herein by reference in its entirety.

BACKGROUND

Technical Field

The present application relates to the field of motor technologies, and in particular, to a motor, and a gimbal and a mechanical arm having the same.

Related Art

Motor products are widely applied to the field such as electronic devices, numerical control tools, carving machines, laser devices, packaging machines, medical devices, and automated devices such as gimbals of UAVs (Unmanned Aerial Vehicles) and mechanical arms of robots.

However, for a currently used motor, an iron core is frequently used as a carrier of a coil windings, and a magnetic field of the motor is in a radial direction. The current motor has disadvantages of lengthy body, heavy weight, large volume and low power density. In addition, large hysteresis and full flow losses of the iron core reduces operating efficiency. A cogging effect causes an output torque ripple, leading to interference with precision control of servo-driven. A large rotor rotational inertia, large armature winding inductance, and a large electromechanic time constant cause poor dynamic performance. Heat dissipation performance is poor because of the structure that the stator and the rotor are surrounded by each other.

SUMMARY

To resolve the foregoing technical problem, embodiments of the present application provide a motor having small volume, light weight, and high operating efficiency, a gimbal and a mechanical arm having the same.

To resolve the foregoing technical problem, the embodiments of the present application provide the following technical solutions:

A motor is provided, including: a support, a circuit board, a rotating shaft, and a permanent magnet. The circuit board is installed on the support, and the circuit board includes a coil circuit. The support is installed on the rotating shaft. The permanent magnet is disposed adjacent to the coil circuit, and there is a gap between the permanent magnet and the coil circuit. The permanent magnet is of an axially magnetized structure.

Further, the coil circuit includes a single layer or multiple layer straight line circuits disposed in radial direction of the rotating shaft.

Further, the circuit board further includes a substrate and the coil circuit further includes a curved circuit, the straight line circuit and the curved circuit being disposed on the substrate; and the straight line circuits disposed in the radial direction of the rotating shaft are sequentially connected in series by using the curved circuit, to form windings of different phases.

Further, the windings from each of the phases are connected to each other by using the curved circuit.

Further, the circuit board further includes: a substrate, a drive control chip, a power circuit, and a detection circuit, the drive control chip, the power circuit, and the detection circuit all being disposed on the substrate; the detection circuit is configured to detect location information of a rotor of the motor; and the power circuit being electrically connected to the coil circuit, the drive control chip is electrically connected to the power circuit and the detection circuit, and the drive control chip is configured to control the power circuit according to the location information of the rotor fed back by the detection circuit.

Further, the detection circuit is disposed on a surface of the substrate, which faces the permanent magnet, and the detection circuit is configured to detect a leakage magnetic field of the permanent magnet and feed back the location information of the rotor.

Further, the substrate includes a ring-shaped main body portion and a protrusion portion extending from an edge of the main body portion, the detection circuit being disposed on the protrusion portion.

Further, the rotor includes an auxiliary magnet sleeved on the rotating shaft, there being a gap between the auxiliary magnet and the support; the support is disposed between the circuit board and the auxiliary magnet; and the detection circuit is disposed on the substrate and faces away from the permanent magnet, and the detection circuit is configured to detect a main magnetic field of the auxiliary magnet and feed back the location information of the rotor.

Further, the support is provided with a notch, and the location of the detection circuit corresponds to the location of the notch.

Further, the rotating shaft includes: a base, an intermediate portion, and a shaft, the base being connected to the shaft by using the intermediate portion; the base, the intermediate portion, and the shaft are all cylindrical-shaped, the diameter of the intermediate portion is greater than the diameter of the shaft and is less than the diameter of the base; and the auxiliary magnet is sleeved on the intermediate portion and abuts against the base; and the support is sleeved on the shaft.

Further, the substrate includes a ring-shaped main body portion, the detection circuit being disposed on the main body portion.

Further, the permanent magnet is ring-shaped, and the outer diameter of the permanent magnet is equal to the outer diameter of the ring-shaped main body portion.

Further, the coil circuit is disposed on the ring-shaped main body portion.

Further, the support includes a body, the body is cylindrical-shaped, the circuit board being sleeved on the body; the support is further provided with a through hole axially passing through the body; and a stator includes a bearing accommodated in the through hole and sleeved on the rotating shaft.

Further, an inner wall of the through hole is provided with a ring-shaped protrusion, and there are two bearings that are respectively disposed on two sides of the protrusion and that abut on the protrusion.

Further, the support includes at least two extension portions, extending from the body in radial direction thereof and in a same plane as the body.

Further, the at least two extension portions are fan-shaped, each fan-shaped extension portion includes a curved outer edge, and the curved outer edges are in a same circle; a notch is provided between each two of the fan-shaped extension portions; and the circuit board is in contact with at least two extension portions.

Further, the motor includes a support plate sleeved on and installed on the rotating shaft, and the permanent magnet is installed on the support plate.

Further, the support plate includes a support plate base and a boss provided on a surface of the support plate base; and the permanent magnet is sleeved on the boss, and the permanent magnet is disposed between the support plate base and the circuit board.

Further, there are two permanent magnets and there is one circuit board, the circuit board is disposed between the two permanent magnets, and there arc gaps between the circuit board and the two permanent magnets.

Further, the support includes a body, and the circuit board is sleeved on and installed on the body.

Further, there are two circuit boards and there is one permanent magnet, the permanent magnet is disposed between the two circuit boards and there are gaps between the permanent magnet and the two circuit boards, and the permanent magnet is of a two-face axially magnetized structure.

Further, there are three circuit boards and there are two permanent magnets; the permanent magnets are respectively located in two gaps formed between each adjacent two of the three circuit boards, and there are gaps between each permanent magnet and the two adjacent circuit boards; and the two permanent magnets are both of a two-face axially magnetized structure.

An embodiment of the present application further provides a gimbal, including: an imaging apparatus, a first motor, and a second motor, where a rotor of the first motor is connected to the imaging apparatus, and the first motor is configured to drive the imaging apparatus to rotate around a rotation central axis of the first motor; and a rotor of the second motor is connected to a stator of the first motor, and the second motor is configured to drive the first motor and the imaging apparatus to rotate around a rotation central axis of the second motor.

Further, the imaging apparatus includes a first camera and a second camera; wherein the first camera and the second camera are respectively installed on two ends of the first motor, and an optical axis of the first camera and an optical axis of the second camera coincide and face opposite directions.

Further, the gimbal further includes a support arm, wherein one end of the support arm is fixedly connected to a stator of the second motor.

Further, one end of the support arm which is far away from the second motor is movably connected to the first motor.

Further, the support arm is of a U-shaped structure, and the end of the support arm which is far away from the second motor is movably connected to the first motor by using a rotational shaft, where an axial direction around which the rotational shaft rotates coincides with an axial direction around which the second motor rotates.

Further, the gimbal further includes a third motor, where a rotor of the third motor is fixedly connected to the support ann.

Further, when the support arm is of the U-shaped structure, the rotor of the third motor is fixedly connected to the bottom of the U-shaped structure of the support arm.

Further, the first motor is a roll axis motor, the second motor is a pitch axis motor, and at least one motor of the first motor and the second motor is the motor as described above.

An embodiment of the present application further provides a mechanical arm, including: a first rotating arm, a second rotating arm, a driving gear, a driven gear and a motor. The first rotating arm is fixedly connected to a stator of the motor, and a rotor of the motor is fixedly connected to the driving gear. The driven gear is fixedly connected to the second rotating arm, and the driven gear is engaged with the driving gear.

Further, the motor is the motor as described above.

Compared with the prior art, the motor of the embodiments in the present application adopts the circuit board as a carrier of the coil circuit to replace an icon core in the traditional technology, thereby eliminating defects such as cogging torque, hysteresis, and eddy-current losses that are generated by an existing motor from the root, and improving operating efficiency. A magnetic field direction of the permanent magnet is designed as a main magnetic flux in axial direction. The permanent magnet and the circuit board are configured so that their end faces face each other in axial direction and there are air gap between the permanent magnet and the circuit board in axial direction, thereby reducing the axial size of the motor in the embodiments of the present application, and reducing the weight and volume of the motor in the embodiments of the present application.

In addition, the drive control chip, the power circuit, and the detection circuit are integrated into the circuit board, so that the motor in the embodiments of the present application has detection and control functions, and no additional drive control circuit and detection circuit are required, thereby further reducing the weight and volume. Moreover, control of the motor in the embodiments of the present application is more intelligent.

BRIEF DESCRIPTION OF THE DRAWINGS

One or more embodiments are exemplarily described by using the figures in the corresponding accompany drawings. The exemplary descriptions do not constitute limitations to the embodiments. Elements having a same reference digital number in the accompany drawings represent similar elements, and unless indicated otherwise, the figures in the accompany drawings do not constitute proportion limitations.

DETAILED DESCRIPTION

Figure 1:
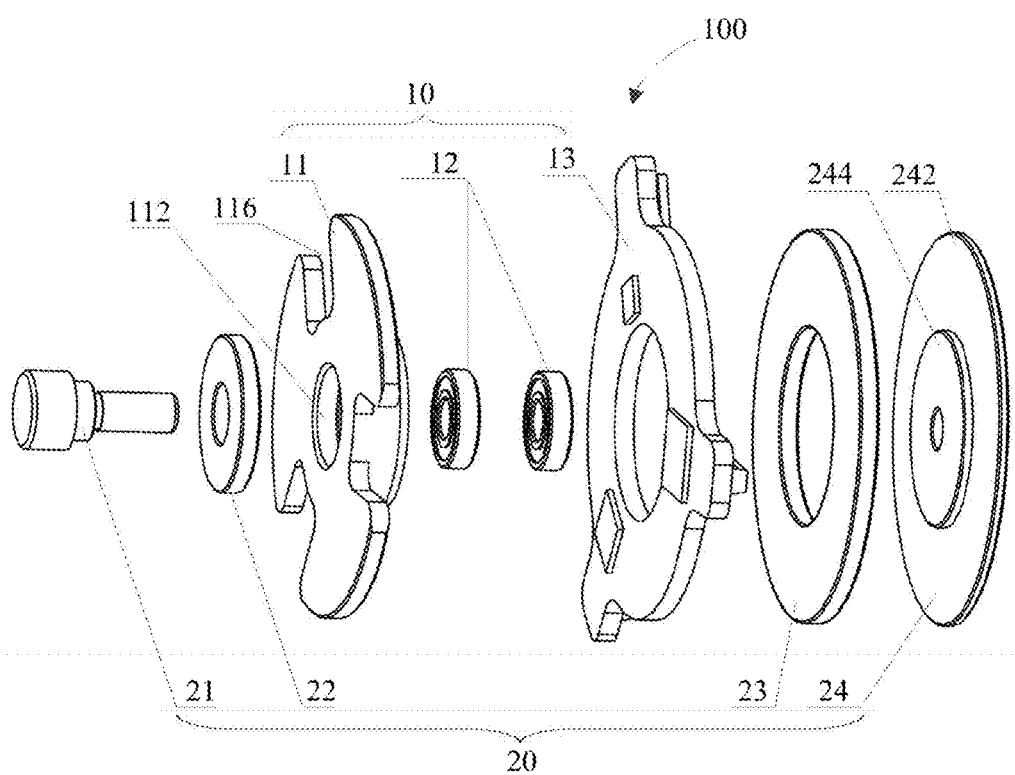
FIG. 1 is an exploded view of a motor according to a first embodiment of the present application.
Figure 2:
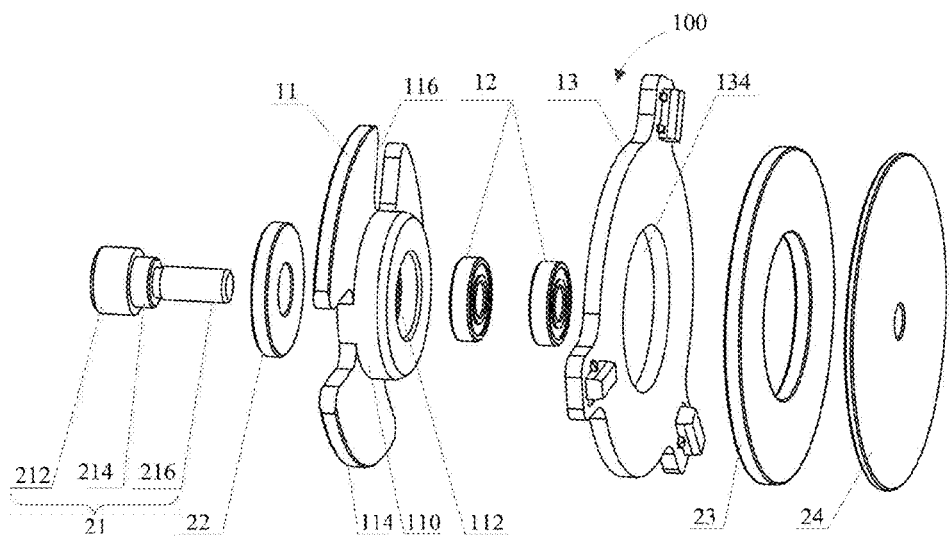
FIG. 2 is an exploded view of the motor in FIG. 1 in another direction.
Figure 3:
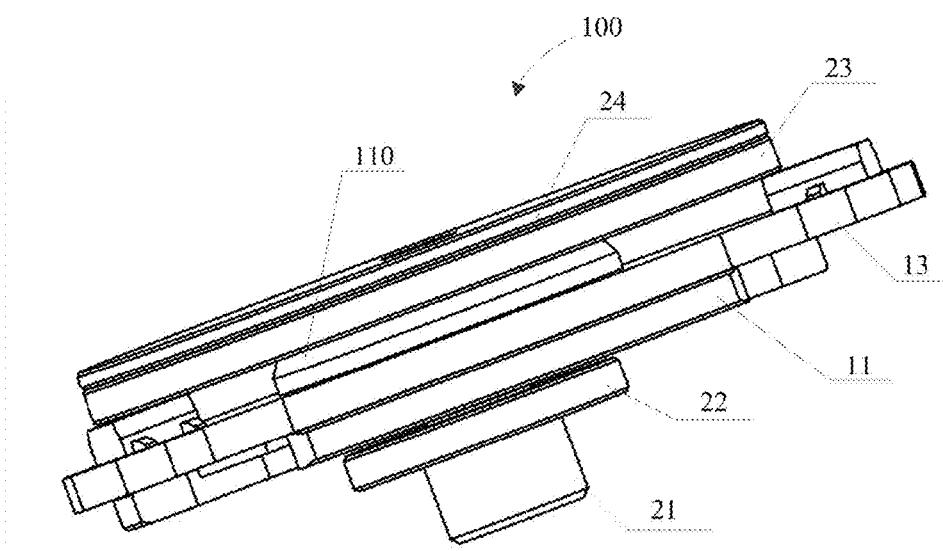
FIG. 3 is a three-dimensional view of the motor according to the first embodiment of the present application.
Figure 4:
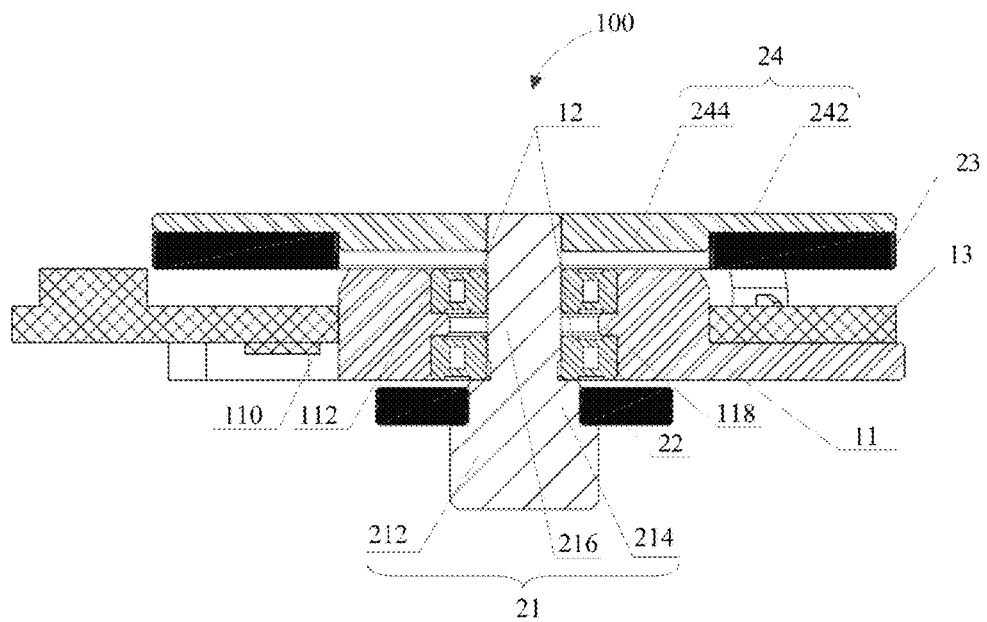
FIG. 4 is a sectional view of the motor according to the first embodiment of the present application.

For understanding the present application, the following describes the present application in detail with reference to the accompanying drawings and specific implementation manners. It should be noted that when an element is expressed as "fixed" to another element, it may be directly on the other element, or there may be one or more intermediate elements between the element and the another element. When an element is expressed as "connected" to another element, it may be directly connected to the other element, or there may be one or more intermediate elements between the element and the another element. In this specification, the terms "vertical", "horizontal", "left", "right", "inside", "outside", and similar expressions are merely for description.

Unless otherwise defined, all technical and scientific terms used in this specification have the same meaning as commonly understood by persons skilled in the art to which the present application belongs. The terms used in this specification are merely for the purpose of describing specific embodiments and are not intended to limit the present application. The term "and/or" used in this specification includes any or all combinations of one or more associated listed items.

Referring to FIG. 1 to FIG. 4, a motor 100 according to a first embodiment of the present application includes a stator 10 and a rotor 20.

The stator 10 includes: a support 11, a bearing 12 and a circuit board 13.

The support 11 includes a body 110 and at least two extension portions 114. The body 110 is cylindrical-shaped, and the at least two extension portions 114 extend from the body 110 in radial direction of the body 110 and are in a same plane as the body. The at least two extension portions 114 are all fan-shaped, each fan-shaped extension portion 114 including a curved outer edge, and curved outer edges of all the fan-shaped extension portions 114 are in a same circle. A notch 116 is provided between each two of the fan-shaped extension portions 114.

The support 11 is further provided with a through hole 112, which is circular-shaped. The through hole 112 passes through the body 110 in an axial direction of the body 110. An inner wall of the through hole 112 is provided with a ring-shaped protrusion 118 (referring to FIG. 4).

There are two bearings 12 disposed in the through hole 112 and tightly pressed against two sides of the protrusion 118. When the two bearings 12 are installed in the through hole 112, an end face of each bearing 12 is flush with an end face of the body 110.

The center of the circuit board 13 is provided with a circular-shaped mounting hole 134. The body 110 passes through the mounting hole 134. The circuit board 13 is sleeved on the body 110 and is in contact with three extension portions 114.

The rotor 20 includes: a rotating shaft 21, an auxiliary magnet 22, a permanent magnet 23 and a support plate 24.

The rotating shaft 21 includes a base 212, an intermediate portion 214 and a shaft 216. The base 212, the intermediate portion 214, and the shaft 216 are all cylindrical-shaped. The intermediate portion 214 is connected between the base 212 and the shaft 216. The diameter of the intermediate portion 214 is greater than the diameter of the shaft 216 and is less than the diameter of the base 212. The two bearings 12 are sleeved on the shaft 216 and are located on two sides of the protrusion 118. The bearing 12 is configured to support the shaft 216, so as to decrease a friction factor of the shaft 216 during a rotation process. The body 110 is in contact with the intermediate portion 214.

The auxiliary magnet 22 is ring-shaped. The auxiliary magnet 22 is sleeved on the intermediate portion 214 and abuts against the base 212. The auxiliary magnet 22 is located between the support 11 and the base 212. There is a gap between the auxiliary magnet 22 and the support 11. A main magnetic field of the auxiliary magnet 22 may be in an axial direction or a radial direction.

The permanent magnet 23 is ring-shaped.

The support plate 24 is installed on one end of the shaft 216 which is far away from the intermediate portion 214. The support plate 24 includes a support plate base 242 and a boss 244. The support plate base 242 and the boss 244 are both ring-shaped. The boss 244 is disposed at the center of a surface of the support plate base 242. The outer diameter of the permanent magnet 23 is equal to the outer diameter of the support plate base 242. The permanent magnet 23 is sleeved on the boss 244 and is in contact with the support plate base 242. The permanent magnet 23 is disposed between the support plate base 242 and the circuit board 13. There is a gap between the permanent magnet 23 and the circuit board 13.

The motor 100 in the embodiments of the present application may be a brushless motor.

Figure 5:
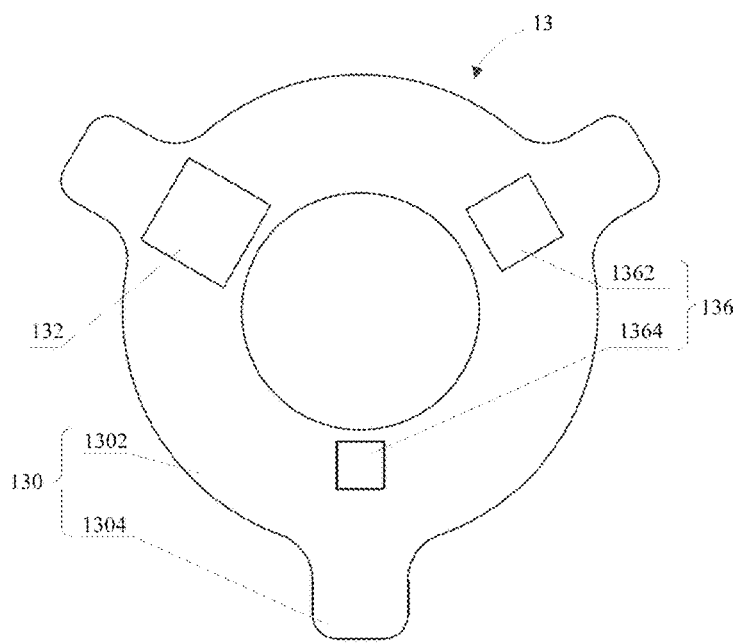
FIG. 5 is a front view of a circuit board in the motor according to the first embodiment of the present application.
Figure 6:
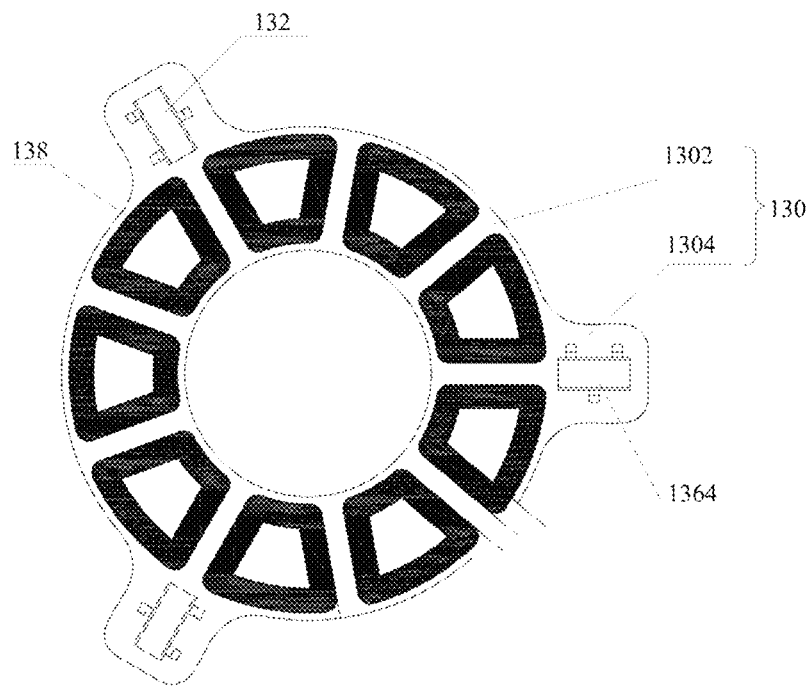
FIG. 6 is a rear view of the circuit board in the motor according to the first embodiment of the present application.

Referring to FIG. 5 and FIG. 6, the circuit board 13 is a printed circuit board. The circuit board 13 includes a substrate 130, a detection circuit 132, a drive control circuit 136 and a coil circuit 138.

The substrate 130 includes a ring-shaped main body portion 1302 and three protrusion portions 1304 extending from an edge of the main body portion 1302. The three protrusion portions 1304 are evenly distributed on the outer edge of the main body portion 1302. The locations of the three protrusion portions 1304 respectively correspond to locations of three notches 116. The mounting hole 134 passes through the center of the main body portion 1302. Outer diameters of the support 11, the main body portion 1302, the permanent magnet 23 and the support plate 24 are equal.

The detection circuit 132 is disposed on the substrate 130 and is configured to detect location information such as a rotation location or an angle of the rotor 20.

In some embodiments, referring to FIG. 5, the detection circuit 132 may include a magnetic encoder. The magnetic encoder is disposed on a surface of the main body portion 1302 and faces away from the permanent magnet 23. A location of the detection circuit 132 corresponds to a location of the notch 116 of the support 11. The detection circuit 132 is configured to sense a main magnetic field of the auxiliary magnet 22 installed on the rotor 20, output a corresponding analog voltage signal, and feed back the location information such as the angle and the rotation location of the rotor 20.

In some other embodiments, referring to FIG. 6, the detection circuit 132 may include a hall element disposed on one of the three protrusion portions 1304 and facing the permanent magnet 23. The hall element senses and detects, by using a hall effect, a leakage magnetic field of the permanent magnet 23, outputs an analog/digital voltage signal, and feeds back the location information such as the rotation location and the angle of the rotor 10. The hall element may be a linear hall sensor or switch hall sensor.

The drive control circuit 136 includes a drive control chip 1362 and a power circuit 1364, both disposed on the substrate 130. The power circuit 1364 is electrically connected to the coil circuit 138. The power circuit 1364 is configured to transmit a current to the coil circuit 138. The drive control chip 1362 is electrically connected to the power circuit 1364 and the detection circuit 132 The drive control chip 1362 is configured to trigger, according to the location information of the rotor 20 fed back by the detection circuit 132, to switch on or switch off a corresponding electronic switch element, and adjust power output of the power circuit 1364, thereby controlling working of the power circuit 1364. The locations of the drive control chip 1362, the power circuit 1364, and the detection circuit 132 respectively correspond the locations of the three notches 116 of the support 11.

Figure 7:
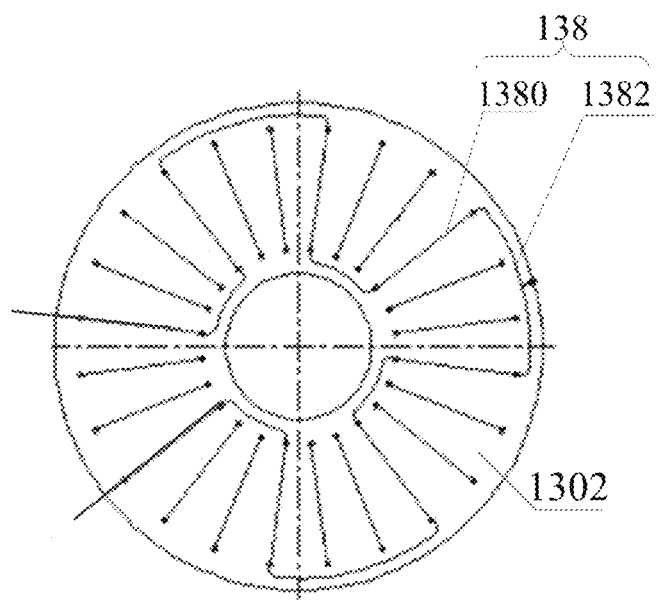
FIG. 7 is a schematic circuit structural diagram of a coil circuit of the circuit board according to the first embodiment of the present application.

Referring to FIG. 6 and FIG. 7, the coil circuit 138 is disposed on the main body portion 1302 and faces the permanent magnet 23. A single layer or multiple layer radial-radiated straight line circuits 1380 are embedded into the coil circuit 138 in a copper clad corrosion manner. The radial straight line circuits 1380 are sequentially connected in series by using a curved circuit 1382, to form a one-phase winding that is equivalent to a common motor (referring to FIG. 6). The windings from each of the phases are connected to each other by using the curved circuit 1382 (for example, a star connection or a delta connection), to form the coil circuit 138 (referring to FIG. 6) of the motor 100 in the embodiments of the present application. By means of such a winding structure, the weight of the rotor 20 may be reduced, and the volume of the rotor 20 is also significantly reduced, so that rotational inertia of the rotor 20 is reduced. Therefore, compared with an existing motor, the motor 100 is characterized by light weight and small volume.

In some embodiments, the coil circuit 138 includes windings of three phases. The windings from each of the phases are sequentially connected in series by using a curved circuit 1382, forming the coil circuit 138.

Figure 8:
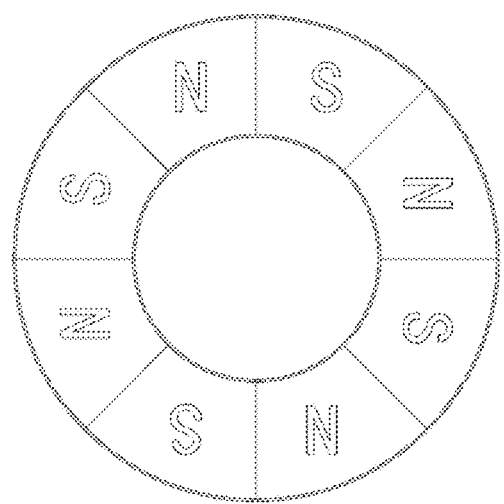
FIG. 8 is a schematic structural diagram of a permanent magnet according to the first embodiment of the present application.

Referring to FIG. 8, the permanent magnet 23 is of a HALBACH matrix axially magnetized structure. The structure may be a whole-piece structure, or multiple pieces of magnets arranged as a HALBACH matrix, providing an axial magnetic field to the coil circuit 138 of the circuit board 13.

In this embodiment, the rotating shaft 21 is a metal rod. The rotating shaft 21 is configured to support the support plate 24 and the permanent magnet 23 and to rotate with the support plate 24 and the permanent magnet 23.

In some embodiments, the rotating shaft 21 may be another rod-shaped element, as long as the rotating shaft 21 can support the support plate 24 and the permanent magnet 23 and can rotate with the support plate 24 and the permanent magnet 23. For example, the rotating shaft 21 may be an imaging apparatus having a camera, which includes a rod-shaped portion. The rod-shaped portion passes through the support plate 24. The rod-shaped portion is configured to support the support plate 24 and the permanent magnet 23 and to rotate with the support plate 24 and the permanent magnet 23.

In some embodiments, the rotating shaft 21 may be configured to support the support 11 and to rotate with the support 11 and the circuit board 13. The bearing 12 is installed in the through hole of the support plate 24, so that the support plate 24 and the permanent magnet 23 may rotate relative to the rotating shaft 21.

In the embodiments of the present application, a magnetic induction line of the permanent magnet 23 is parallel to an axial central line of the rotating shaft 21. The stator 10 and the rotor 20 are configured so that their end faces face each other in axial direction and there are air gap between the permanent magnet and the circuit board in axial direction, which may eliminate the end winding from an invalid electromagnetic response, so that the axial size, weight, and volume are significantly reduced, and a power density is increased, and that a rotational inertia, winding inductance, and an electromechanic time constant of the rotor 20 are reduced, thereby effectively improving dynamic performance, and that thermal conduction space is open, thereby improving heat dissipation performance.

Moreover, the circuit board 13 in the embodiments of the present application is adopted as a carrier of the coil circuit 138 to replace an icon core in the traditional technology. The coil circuit 138 is printed on the circuit board 13 in a copper clad corrosion manner, thereby eliminating defects such as cogging torque, hysteresis, and eddy-current losses that are generated by the existing motor from the root, weakening torque disturbance, and improving operating efficiency.

In addition, the drive control chip 1362, the power circuit 1364 and the detection circuit 132 are integrated into the circuit board 13, so that the motor 100 in the embodiments of the present application has detection and control functions, and no additional drive control circuit and detection circuit are required, thereby further reducing the weight and volume. Moreover, control of the motor 100 in the embodiments of the present application is more intelligent.

Figure 9:
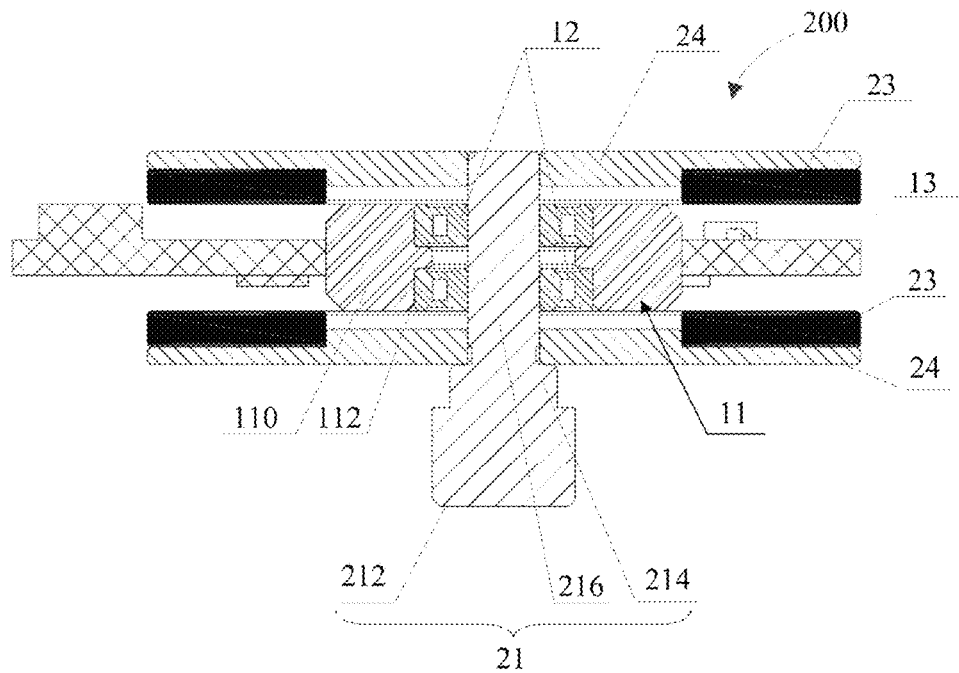
FIG. 9 is a sectional view of a motor according to a second embodiment of the present application.

Referring to FIG. 9, a motor 200 according to a second embodiment of the present application includes a support 11, a bearing 12, and a circuit board 13. The circuit board 13 is sleeved on a body 110 of the support 11. The bearing 12 is accommodated in a through hole 112 of the support 11.

The motor 200 further includes a rotating shaft 21, two permanent magnets 23 and two support plates 24. One permanent magnet 23 is correspondingly installed on one support plate 24. One support plate 24 is sleeved on a shaft 216 of the rotating shaft 21 and is in contact with an intermediate portion 214. The other one support plate 24 is sleeved on and fixed at one end of the shaft 216 which is away from the intermediate portion 214. The two permanent magnets 23 are disposed on two sides of the circuit board 13, and face two opposite surfaces of the circuit board 13.

Each permanent magnet 23 is the same as the permanent magnet 23 in the first embodiment. The permanent magnet 23 may be a whole-piece structure for being HALBACH axially magnetized, or may be pieces of magnets arranged as a HALBACH matrix.

The detection circuit 132 may include a hall element that is disposed on one of three protrusion portions 1304 of the circuit board 13 and faces one of the permanent magnets 23. Or the detection circuit 132 may include two hall elements that are disposed on two surfaces of one protrusion portion 1304 and respectively face two of the permanent magnets 23.

In this embodiment, the auxiliary magnet 22 is omitted.

The bearing 12, the circuit board 13, the rotating shaft 21, and the support plate 24 are the same as those in the first embodiment. The details thereof are not described herein again.

In one way of implementing the present application, compared with the support 11 in the first embodiment, the support 11 includes only the body 110, and the three extension portions 114 are omitted.

In the embodiments of the present application, a magnetic field direction of the permanent magnet 23 is designed as a main magnetic flux, and the permanent magnet 23 and the circuit board 13 are configured so that their end faces face each other in axial direction and there are air gap between the permanent magnet and the circuit board in axial direction, which may eliminate the end winding from an invalid electromagnetic response so that the axial size, weight, and volume are significantly reduced, and a power density is increased and that a rotational inertia, winding inductance, and an electromechanic time constant of the motor 200 are reduced, thereby effectively improving dynamic performance, and that thermal conduction space is open, thereby improving heat dissipation performance.

The circuit board 13 in the embodiments of the present application is adopted as a carrier of the coil circuit 138 to replace an icon core in the traditional technology. The coil circuit 138 is printed on the circuit board 13 in a copper clad corrosion manner, thereby eliminating defects such as togging torque, hysteresis, and eddy-current losses that are generated by the existing motor from the root, weakening torque disturbance, and improving operating efficiency.

Moreover, two permanent magnets 23 are disposed on two sides of the circuit board 13, so that a magnetic flux of the motor 200 is improved and operating efficiency is improved, thereby increasing a power of the motor 100. For some application scenarios in which a special appearance/interface is used, this embodiment of the present application can take advantages of strong power and high efficiency.

In addition, the drive control chip 1362, the power circuit 1364, and the detection circuit 132 are integrated into the circuit board 13, so that the motor 200 in the embodiments of the present application has detection and control functions, and no additional drive control circuit and detection circuit are required, thereby further reducing the weight and volume. Moreover, control of the motor 200 in the embodiments of the present application is more intelligent.

Figure 10:
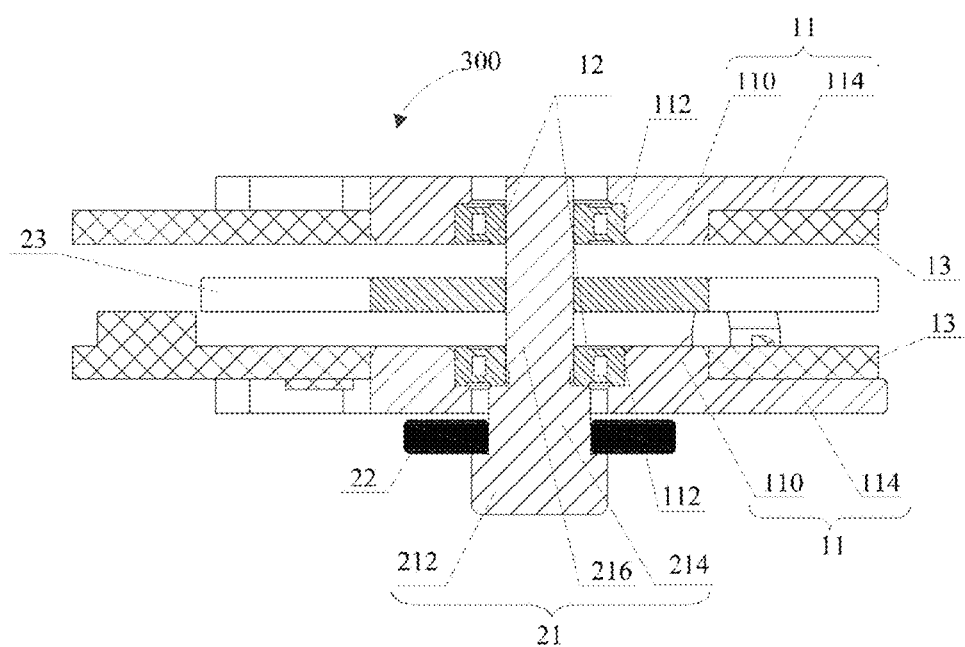
FIG. 10 is a sectional view of a motor according to a third embodiment of the present application.

Referring to FIG. 10, a motor 300 according to a third embodiment of the present application includes two supports 11, two bearings 12 and two circuit boards 13. Each circuit board 13 is sleeved on a body 110 of the corresponding support 11 and is in contact with an extension portion 114. Each bearing 12 is accommodated in a through hole 112 of the corresponding support 11.

The motor 300 further includes a rotating shaft 21 and a permanent magnet 23.

One support 11 is sleeved on an intermediate portion 214 of the rotating shaft 21, and the other one support 11 is sleeved on one end of a shaft 216 which is away from the intermediate portion 214.

The permanent magnet 23 is sleeved on the shaft 216 and is disposed between the two circuit boards 13. The two circuit boards 13 respectively face two opposite surfaces of the permanent magnet 23, and there are gaps between the two circuit boards 13 and the permanent magnet 23. The permanent magnet 23 is of a HALBACH two-face axially magnetized structure, and the structure may be implemented as a whole-piece structure for being HALBACH two-face axially magnetized, or may be implemented as a whole piece for being HALBACH single-face axially magnetized and for being back-to-back bound, or may be implemented as pieces of magnets arranged on two sides of a HALBACH matrix.

One of the two circuit boards 13 is farther away from the auxiliary magnet 22 than the other one of the two circuit boards 13. Compared with the circuit board 13 in the first embodiment, the detection circuit 132 may be omitted in the circuit board 13 that is away from the auxiliary magnet 22.

However, in some embodiments, the circuit board 13 that is away from the auxiliary magnet 22 may further include a detection circuit 132. The detection circuit 132 may include a hall element, and the hall element is disposed on one of three protrusion portions 1304 of the circuit board 13 that is away from the auxiliary magnet 22, and faces the permanent magnet 23.

The bearing 12, the circuit board 13 that is close to the auxiliary magnet 22, and the rotating shaft 21 are the same as those in the first embodiment. The details thereof are not described herein again.

In the embodiments of the present application, a through hole 112 of the support 11 accommodates only one bearing 12. Therefore, compared with the support 11 in the first embodiment, the thickness is reduced, but other structures are the same. The details thereof are not described herein again In the embodiments of the present application, a magnetic field direction of the permanent magnet 23 is designed as a main magnetic flux, and the permanent magnet 23 and the circuit board 13 are configured so that their end faces face each other in axial direction and there are air gap between the permanent magnet and the circuit board in axial direction, which may eliminate the end winding from an invalid electromagnetic response, so that the axial size, weight, and volume are significantly reduced, and a power density is increased, and that a rotational inertia, winding inductance, and an electromechanic time constant of the motor 300 are reduced, thereby effectively improving dynamic performance; thermal conduction space is open, thereby improving heat dissipation performance.

The circuit board 13 in the embodiments of the present application is adopted as a carrier of the coil circuit 138 to replace an icon core in the traditional technology. The coil circuit 138 is printed on the circuit board 13 in a copper clad corrosion manner, thereby eliminating defects such as cogging torque, hysteresis, and eddy-current losses that are generated by the existing motor from the root, weakening torque disturbance, and improving operating efficiency.

In addition, two circuit boards 13 are disposed on two sides of the permanent magnet 23, and the quantity of windings of inductance coils are increased based on the two-face axially magnetized permanent magnet 23, thereby increasing an output power and improving operating efficiency. For some application scenarios in which a special appearance/interface is used, this embodiment of the present application can take advantages of strong power and high efficiency.

In addition, the drive control chip 1362, the power circuit 1364, and the detection circuit 132 are integrated into the circuit board 13, so that the motor 300 in the embodiments of the present application has detection and control functions, and no additional drive control circuit and detection circuit are required, thereby further reducing the weight and volume. Moreover, control of the motor 300 in the embodiments of the present application is more intelligent.

Figure 11:
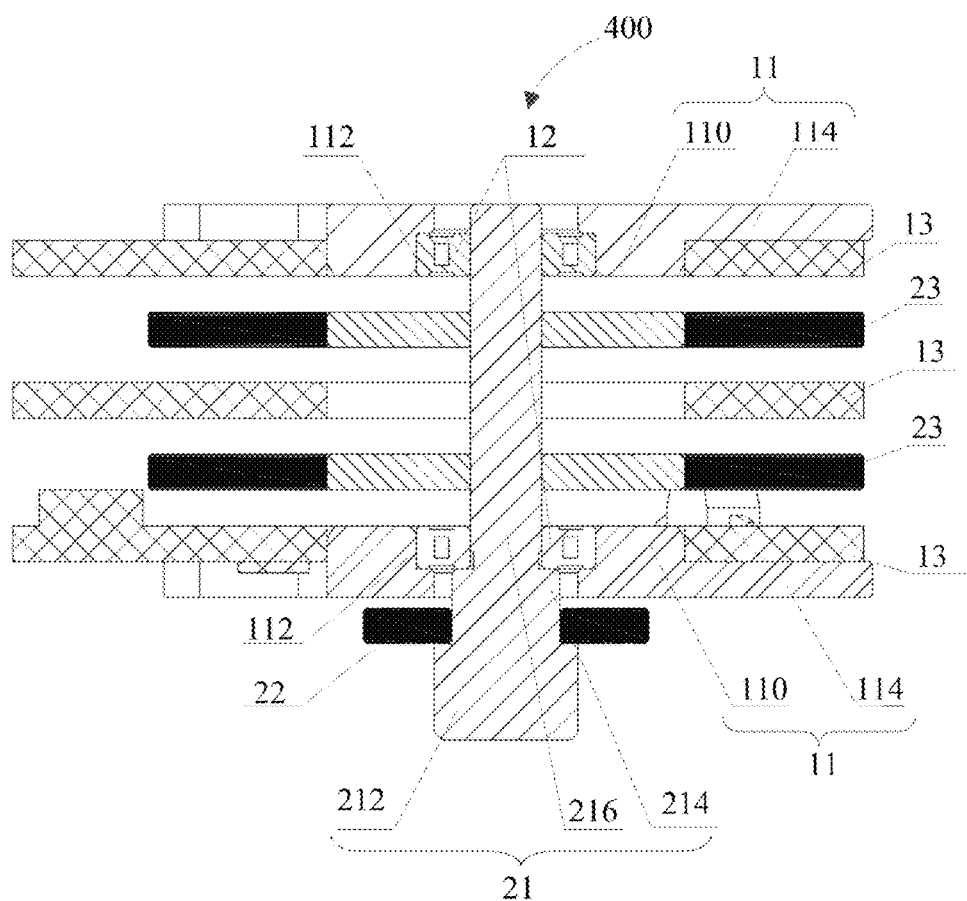
FIG. 11 is a sectional view of a motor according to a fourth embodiment of the present application.

Referring to FIG. 11, a motor 400 according to a fourth embodiment of the present application includes two supports 11, two bearings 12 and three circuit boards 13. Two of the three circuit boards 13 are sleeved on a body 110 of a corresponding support 11, respectively, and are in contact with an extension portion 114. The third circuit board 13 is located between the two supports 11. Each bearing 12 is accommodated in a through hole 112 of the corresponding support 11. The two circuit boards 13 are disposed opposite to each other.

The motor 400 further includes a rotating shaft 21 and two permanent magnets 23.

One support 11 is sleeved on an intermediate portion 214 of the rotating shaft 21, and the other one support 11 is sleeved on one end of a shaft 216 which is away from the intermediate portion 214.

The foregoing two permanent magnets 23 are sleeved on the shaft 216, disposed between the two circuit boards 13 on the two supports 11 and on two sides of the another circuit board 13. There is a gap between each permanent magnet 23 and the adjacent circuit board 13.

In the embodiments of the present application, the permanent magnet 23 is of a HALBACH axially magnetized structure, and the structure may be a whole-piece structure for being HALBACH axially magnetized, or may be pieces of magnets arranged as a HALBACH matrix. Magnetized coverage may be a single face or two faces.

Two of the three circuit boards 13 are farther away from an auxiliary magnet 22 than the third circuit boards 13. Compared with the circuit board 13 in the first embodiment, the detection circuit 132 may be omitted in the circuit board 13 that is away from the auxiliary magnet 22. However, in some embodiments, the circuit board 13 that is away from the auxiliary magnet 22 may further include a detection circuit 132. The detection circuit 132 may include a hall element, disposed on one of three protrusion portions 1304 of the circuit board 13 that is away from the auxiliary magnet 22 and facing the permanent magnet 23.

The bearing 12, the circuit board 13 that is close to the auxiliary magnet 22 and the rotating shaft 21 are the same as those in the first embodiment. The details thereof are not described herein again.

In the embodiments of the present application, the through hole 112 of the support 11 accommodates only one bearing 12. Therefore, compared with the support 11 in the first embodiment, the thickness is reduced while other structures thereof are the same. The details thereof are not described herein again.

In the embodiments of the present application, a magnetic field direction of the permanent magnet 23 is designed as a main magnetic flux, and the permanent magnet 23 and the circuit board 13 are configured so that their end faces face each other in axial direction and there are air gap between the permanent magnet and the circuit board in axial direction, which may eliminate the end winding from an invalid electromagnetic response, so that the axial size, weight, and volume are significantly reduced, and a power density is increased, and that a rotational inertia, winding inductance, and an electromechanic time constant of the motor 400 are reduced, thereby effectively improving dynamic performance; thermal conduction space is open, thereby improving heat dissipation performance.

The circuit board 13 in the embodiments of the present application is adopted as a carrier of the coil circuit 138 to replace an icon core in the traditional technology. The coil circuit 138 is printed on the circuit board 13 in a copper clad corrosion manner, thereby eliminating defects such as cogging torque, hysteresis, and eddy-current losses that are generated by the existing motor from the root, weakening torque disturbance, and improving operating efficiency.

Moreover, in the embodiments of the present application, two permanent magnets 23 and three circuit boards 13 are disposed, which improves a magnetic flux of the motor 400 and increase the quantity of windings of inductance coils, thereby effectively increasing an output power and improving operating efficiency. For some application scenarios in which a special appearance/interface is used, the embodiments of the present application can take advantages of strong power and high efficiency.

In addition, the drive control chip 1362, the power circuit 1364 and the detection circuit 132 are integrated into the circuit board 13, so that the motor 400 in the embodiments of the present application has detection and control functions, and no additional drive control circuit and detection circuit are required, thereby further reducing the weight and volume. Moreover, control of the motor 400 in the embodiments of the present application is more intelligent.

Figure 12:
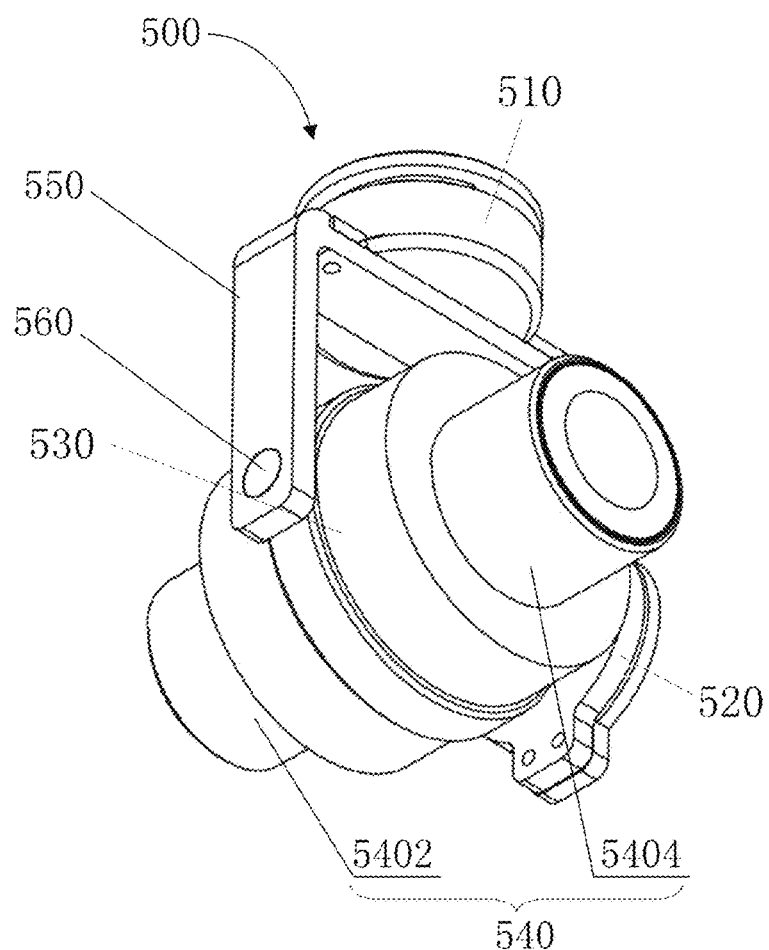
FIG. 12 is a three-dimensional view of a gimbal according to a fifth embodiment of the present application.

Referring to FIG. 12, a gimbal 500 according to a fifth embodiment of the present application is provided, including a first motor 530, a second motor 520 and an imaging apparatus 540. A rotor of the first motor 530 is connected to the imaging apparatus 540 and is configured to drive the imaging apparatus 540 to rotate around a rotation central axis of first motor 530. A rotor of the second motor 520 is connected to a stator of the first motor 530 and is configured to drive the first motor 530 and the imaging apparatus 540 to rotate around a rotation central axis of the second motor 520. In this embodiment, the gimbal 500 further includes a third motor 510. A rotor of the third motor 510 is connected to a stator of the second motor 520. The third motor 510 is configured to drive the second motor 520, the first motor 530 and the imaging apparatus 540 to rotate around a rotation central axis of the third motor 510.

In the embodiments of the present application, the first motor 530, the second motor 520 and the third motor 510 are respectively a roll axis motor, a pitch axis motor and a yaw axis motor. The rotational central axes of the first motor 530, the second motor 520 and the third motor 510 are respectively a roll axis, a pitch axis and a yaw axis.

Preferably, the gimbal 500 further includes a support arm 550. The support arm 550 is fixedly connected to the rotor of the third motor 510, and is fixedly connected to the stator of the second motor 520.

In one way of implementing the present application, the support arm 550 may be of an L-shaped structure. One end of the support arm 550 is fixedly connected to the stator of the second motor 520, and the other end of the support arm 550 is fixedly connected to the rotor of the third motor 510.

In another way of implementing the present application, the support arm 550 may be of a U-shaped structure. One end of the support arm 550 is fixedly connected to the stator of the second motor 520, and one end of the support arm 550 which is away from the second motor 520 is movably connected to the first motor 530. The end of the support arm 550 which is away from the second motor 520 is movably connected to the first motor 530 is movably connected to the first motor 530 by using a rotational shaft 560. An axial direction around which the rotational shaft 560 rotates coincides with an axial direction around which the second motor 520 rotates. The rotor of the third motor 510 is fixedly connected to the bottom of the U-shaped structure of the support arm 550.

The imaging apparatus 540 includes a first camera 5402 and a second camera 5404. The first camera 5402 and the second camera 5404 are respectively installed on two ends of the first motor 530 and face opposite directions. The first motor 530 is configured to drive the first camera 5402 and the second camera 5404 to rotate around the roll axis of the first motor 530.

In this embodiment, an optical axis of the first camera 5402 coincides with an optical axis of the second camera 5404. The first camera 511 and the second camera 512 can work together to capture a 360° view. In some other embodiments, optical axes of the first camera 511 and the second camera 512 may at an angle to each other as long as the first camera 511 and the second camera 512 can work together to capture a 360° view.

At least one of the first motor 530, the second motor 520 and the third motor 510 is the motor 100 according to the first embodiment, or the motor 200 according to the second embodiment, or the motor 300 according to the third embodiment, or the motor 400 according to the fourth embodiment. The gimbal 500 may be applied to a UAV (Unmanned Aerial Vehicle).

In some embodiments, the imaging apparatus 540 may include only one camera.

Figure 13:
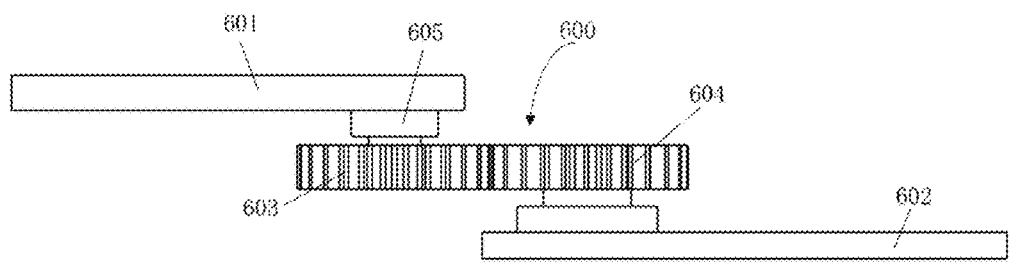
FIG. 13 is a schematic structural diagram of a mechanical arm according to a sixth embodiment of the present application.
Figure 14:
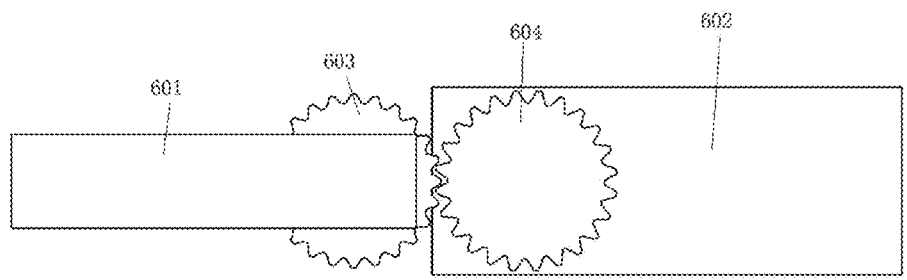
FIG. 14 is a schematic structural diagram of the mechanical arm in FIG. 13 in another direction.

Referring to FIG. 13 and FIG. 14, a mechanical arm 600 according to a sixth embodiment of the present application is provided, including a first rotating arm 601, a second rotating arm 602, a driving gear 603, a driven gear 604 and a motor 605. The motor 605 is disposed at one end of the first rotating arm 601 which is close to the second rotating arm 602. A stator of the motor 605 is fixedly connected to the first rotating arm 601, and a rotor of the motor 605 is fixedly connected to the driving gear 603, so as to drive the driving gear 603 to rotate. The driven gear 604 is fixed at the end of the first rotating arm 601 which is close to the second rotating arm 602, and the driven gear 604 is engaged with the driving gear 603. When the motor 605 drives the driving gear 603 to rotate, the driven gear 604 rotates with the driving gear 603, so that the second rotating arm 602 moves relative to the first rotating arm 601.

When shapes of the driving gear 603 and the driven gear 604 are both circular, while being driven by the motor 605, the second rotating arm 602 rotates relative to the first rotating arm 601, as shown in FIG. 14.

When the driving gear 603 is of a circular structure and the driven gear 604 is of a band-shaped linear structure, while being driven by the motor 605, the second rotating arm 602 performs a translational motion relative to the first rotating arm 601.

When the driving gear 603 is of a band-shaped linear structure, and the driven gear 604 is of a circular structure, while being driven by the motor 605, the second rotating arm 602 performs a translational motion relative to the first rotating arm 601.

When the driving gear 603 and the driven gear 604 are both of a band-shaped linear structure, while being driven by the motor 605, the second rotating arm 602 performs a translational motion relative to the first rotating arm 601.

The shapes of the driving gear 603 and the driven gear 604 are not limited in the embodiments of the present application. The shape of the driving gear 603 or the shape of the driven gear 604 may alternatively be an ellipse. The second rotating arm 602 moves relative to the first rotating arm 601 according to the shapes of the driving gear 603 and the driven gear 604.

The motor 605 may be the motor 100 according to the first embodiment, or the motor 200 according to the second embodiment, or the motor 300 according to the third embodiment, or the motor 400 according to the fourth embodiment.

The mechanical arm 600 may be applied to a robot, a medical appliance, or the like.

Finally, it should be noted that the foregoing embodiments are merely intended for describing the technical solutions of the present application, but not for limiting the present application. Although under the idea of the present application, technical features of the foregoing embodiments or different embodiments may be combined, steps may be implemented in any sequence, and many other changes of different aspects of the present application exist. For brevity, they are not provided in details. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. A motor, comprising;
   a support;
   a circuit board, installed on the support, wherein the circuit board comprises a substrate and a coil circuit disposed on the substrate, and the circuit board further comprises a drive control chip, a power circuit, and detection circuit, the drive control chip, the power circuit, and the detection circuit all being disposed on the substrate; wherein the detection circuit is configured to detect location information of a rotor of the motor; and wherein the power circuit is electrically connected to the coil circuit, the drive control chip being electrically connected to the power circuit and the detection circuit, and the drive control chip is configured to control the power circuit according to the location information of the rotor fed back by the detection circuit;
   a rotating shaft, wherein the support is sleeved on the rotating shaft;
   a support plate installed on one end of the rotating shaft; and
   a permanent magnet, disposed on the support plate and adjacent to the coil circuit,
   wherein the coil circuit faces the permanent magnet and there is a gap between the permanent magnet and the coil circuit, and the permanent magnet is of an axially magnetized structure.

2. The motor according to claim 1, wherein the coil circuit comprises a single layer straight line circuit or multiple layer straight line circuits disposed in radial direction of the rotating shaft.

3. The motor according to claim 2, wherein the coil circuit further comprises a curved circuit, the straight line circuit and the curved circuit being disposed on the substrate; and the straight line circuits disposed in the radial direction of the rotating shaft are sequentially connected in series by using the curved circuit, to form windings of different phases.

4. The motor according to claim 3, wherein the windings from each of the phases are connected to each other by using the curved circuit.

5. The motor according to claim 1, wherein the detection circuit is disposed on a surface of the substrate which faces the permanent magnet, and the detection circuit is configured to detect a leakage magnetic field of the permanent magnet and feed back the location information of the rotor.

6. The motor according to claim 5, wherein the substrate comprises a ring-shaped main body portion and a protrusion portion extending from an edge of the main body portion, the detection circuit being disposed on the protrusion portion.

7. The motor according to claim 1, wherein the rotor comprises an auxiliary magnet sleeved on the rotating shaft, there being a gap between the auxiliary magnet and the support; and the support is disposed between the circuit board and the auxiliary magnet; and the detection circuit is disposed on the substrate and faces away from the permanent magnet, and the detection circuit is configured to detect a main magnetic field of the auxiliary magnet and feed back the location information of the rotor.

8. The motor according to claim 7, wherein the support is provided with a notch, and the location of the detection circuit corresponds to the location of the notch.

9. The motor according to claim 7, wherein the rotating shaft comprises: a base, an intermediate portion and a shaft, the intermediate portion being connected between the base and the shaft; the base, the intermediate portion and the shaft are all cylindrical-shaped, and the diameter of the intermediate portion is greater than the diameter of the shaft and is less than the diameter of the base; the auxiliary magnet is sleeved on the intermediate portion and abuts against the base; and the support is sleeved on the shaft.

10. The motor according to claim 7, wherein the substrate comprises a ring-shaped main body portion, the detection circuit being disposed on the main body portion.

11. The motor according to claim 6, wherein the permanent magnet is ring-shaped, and the outer diameter of the permanent magnet is equal to the outer diameter of the ring-shaped main body portion.

12. The motor according to claim 6, wherein the coil circuit is disposed on the ring-shaped main body portion.

13. The motor according to claim 1, wherein the support comprises a body, the circuit board being sleeved on the bodies; the support is further provided with a through hole axially passing through the body; and a stator comprises a bearing accommodated in the through hole and sleeved on the rotating shaft.

14. The motor according to claim 13, wherein the support comprises at least two extension portions, extending from the body in radial direction thereof and in a same plane as the body.

15. The motor according to claim 14, wherein the at least two extension portions are fan-shaped, each fan-shaped extension portion comprises a curved outer edge, and the curved outer edges are in a same circle; a notch is provided between each two of the fan-shaped extension portions; and the circuit board is in contact with at least two extension portions.

16. The motor according to claim 1, wherein the support plate comprises a support plate base and a boss provided on a surface of the support plate base; and the permanent magnet is sleeved on the boss, and the permanent magnet is disposed between the support plate base and the circuit board.

17. The motor according to claim 1, wherein there are two permanent magnets and there is one circuit board, the circuit board is disposed between the two permanent magnets, and there are gaps between the circuit board and the two permanent magnets.

18. The motor according to claim 1, wherein there are two circuit boards and there is one permanent magnet, the permanent magnet is disposed between the two circuit boards and there are gaps between the permanent magnet and the two circuit boards, and the permanent magnet is of a two-face axially magnetized structure.

19. The motor according to claim 1, wherein there are three circuit boards and there are two permanent magnets; the permanent magnets are respectively located hi two gaps formed between each adjacent two of the three circuit boards, and there are gaps between each permanent magnet and two adjacent circuit boards; and the two permanent magnets are both of a two-face axially magnetized structure.

20. A gimbal, comprising: an imaging apparatus, a first motor and a second motor, wherein a rotor of the first motor is connected to the imaging apparatus, and the first motor is configured to drive the imaging apparatus to rotate around a rotation central axis of the first motor; and a rotor of the second motor is connected to a stator of the first motor, and the second motor is configured to drive the first motor and the imaging apparatus to rotate around a rotation central axis of the second motor, wherein the first motor is a roll axis motor and the second motor is a pitch axis motor, and at least one of first motor and the second motor comprises:
    a support;
    a circuit board, installed on the support, wherein the circuit board comprises a substrate and a coil circuit disposed on the substrate;
    a rotating shaft, wherein the support is sleeved on the rotating shaft;
    a support plate installed on one end of the rotating shaft; and
    a permanent magnet, disposed on the support plate and adjacent to the coil circuit, wherein the coil circuit faces the permanent magnet and there is a gap between the permanent magnet and the coil circuit, and the permanent magnet is of an axially magnetized structure.

21. The gimbal according to claim 20, wherein the imaging apparatus comprises a first camera and a second camera; wherein
    the first camera and the second camera are respectively installed on two ends of the first motor, and an optical axis of the first camera and an optical axis of the second camera coincide and face opposite directions.

22. The gimbal according to claim 20, further comprising a support arm, wherein
    one end of the support arm is fixedly connected to a stator of the second motor.

23. The gimbal according to claim 22, wherein one end of the support arm which is far away from the second motor is movably connected to the first motor.

24. The gimbal according to claim 23, wherein the support arm is of a U-shaped structure, and the end of the support arm which is far away from the second motor is movably connected to the first motor by a rotating shaft, wherein an axial direction around which the rotating shaft rotates coincides with an axial direction around which the second motor rotates.

25. The gimbal according to claim 22, further comprising a third motor, wherein a rotor of the third motor is fixedly connected to the support arm.

26. A mechanical arm, comprising: a first rotating arm, a second rotating arm, a driving gear, a driven gear and a motor, wherein
    the first rotating arm is fixedly connected to a stator of the motor, and a rotor of the motor is fixedly connected to the driving gear; and
    the driving gear is engaged with the driven gear, and the driven gear is fixedly connected to the second rotating arm, wherein the motor comprises:
    a support;
    a circuit board, installed on the support, wherein the circuit board comprises a substrate and a coil circuit disposed on the substrate;
    a rotating shaft, wherein the support is sleeved on the rotating shaft;
    a support plate installed on one end of the rotating shaft; and
    a permanent magnet, disposed on the support plate and adjacent to the coil circuit, wherein the coil circuit faces the permanent magnet and there is a gap between the permanent magnet and the coil circuit, and the permanent magnet is of an axially magnetized structure.

* * * * *